(12) United States Patent
Caster et al.

(10) Patent No.: US 12,709,213 B2
(45) Date of Patent: Aug. 18, 2026

(54) EXTERNAL STORAGE RACK FOR RECREATIONAL VEHICLES

(71) Applicant: MORRYDE INTERNATIONAL, INC., Elkhart, IN (US)

(72) Inventors: Michael Caster, Elkhart, IN (US); Darrell Byers, Topeka, IN (US)

(73) Assignee: MORRYDE INTERNATIONAL, INC., Elkhart, IN (US)

( * ) Notice: Subject to any disclaimer, the term of this patent is extended or adjusted under 35 U.S.C. 154(b) by 400 days.

(21) Appl. No.: 18/367,259

(22) Filed: Sep. 12, 2023

(65) Prior Publication Data

US 2024/0083335 A1 Mar. 14, 2024

Related U.S. Application Data

(60) Provisional application No. 63/406,112, filed on Sep. 13, 2022.

(51) Int. Cl.
*B60P 3/36* (2006.01)

(52) U.S. Cl.
CPC .................................... *B60P 3/36* (2013.01)

(58) Field of Classification Search
None
See application file for complete search history.

(56) References Cited

U.S. PATENT DOCUMENTS 2,698,118 A * 12/1954 Dickason .............. B62D 43/02 224/42.21
3,371,832 A * 3/1968 Sekino .................. B62D 43/02 224/42.21
3,785,695 A * 1/1974 Conkle .................. B62D 33/08 296/50
4,099,760 A * 7/1978 Mascotte ............... B62D 43/02 224/507
5,092,503 A * 3/1992 Cocks ...................... B60R 9/06 224/508
5,358,157 A * 10/1994 Abretske ................ B62D 43/02 224/42.21
8,439,612 B2 * 5/2013 Chamoun .............. B60P 3/077 410/94
9,834,151 B2 * 12/2017 Henry ...................... B60R 9/00
11,891,124 B2 * 2/2024 Kiefer, IV ................ B60R 9/08
2006/0016048 A1 * 1/2006 DiMario ................. E05D 9/005 16/260
2007/0045368 A1 * 3/2007 Lavelle ..................... B60R 9/00 224/325

FOREIGN PATENT DOCUMENTS

GB 2203397 A * 10/1988 .............. B60R 9/06

* cited by examiner

*Primary Examiner* — Joseph D. Pape

(74) *Attorney, Agent, or Firm* — MARSHALL, GERSTEIN & BORUN LLP

(57) ABSTRACT

External storage for a recreational vehicle includes a storage rack defining a plurality of openings extending through front and rear main faces thereof to allow objects to be secured to the storage rack, a plurality of hinges coupled to a proximal edge of the storage rack allowing the storage rack to be pivoted relative to the recreational vehicle, and a storage catch having a first member coupled to the storage rack and a second member configured to be coupled to the recreational vehicle.

21 Claims, 6 Drawing Sheets

EXTERNAL STORAGE RACK FOR RECREATIONAL VEHICLES

CROSS-REFERENCE TO RELATED APPLICATION

This application claims the priority benefit of U.S. Provisional Appl. No. 63/406,112, filed Sep. 13, 2022, which is hereby incorporated by reference herein in its entirety.

FIELD OF THE DISCLOSURE

The present disclosure generally relates to recreational vehicles and, more particularly, to storage for recreational vehicles.

DETAILED DESCRIPTION

External storage racks for recreational vehicles are described herein that pivotably couple to a wall of the vehicle adjacent to an entry opening therein, such as a door, window, and the like. The storage racks provide additional storage options for large items or items that can be exposed to weather, while also providing access to the entry opening by allowing a user to pivot the storage rack away from the entry opening. In some implementations, one or more locks can releasably retain the storage racks in a storage position extending along the wall of the vehicle over the entry opening and, if desired, in an extended position extending away from the wall of the vehicle.

Figure 1:
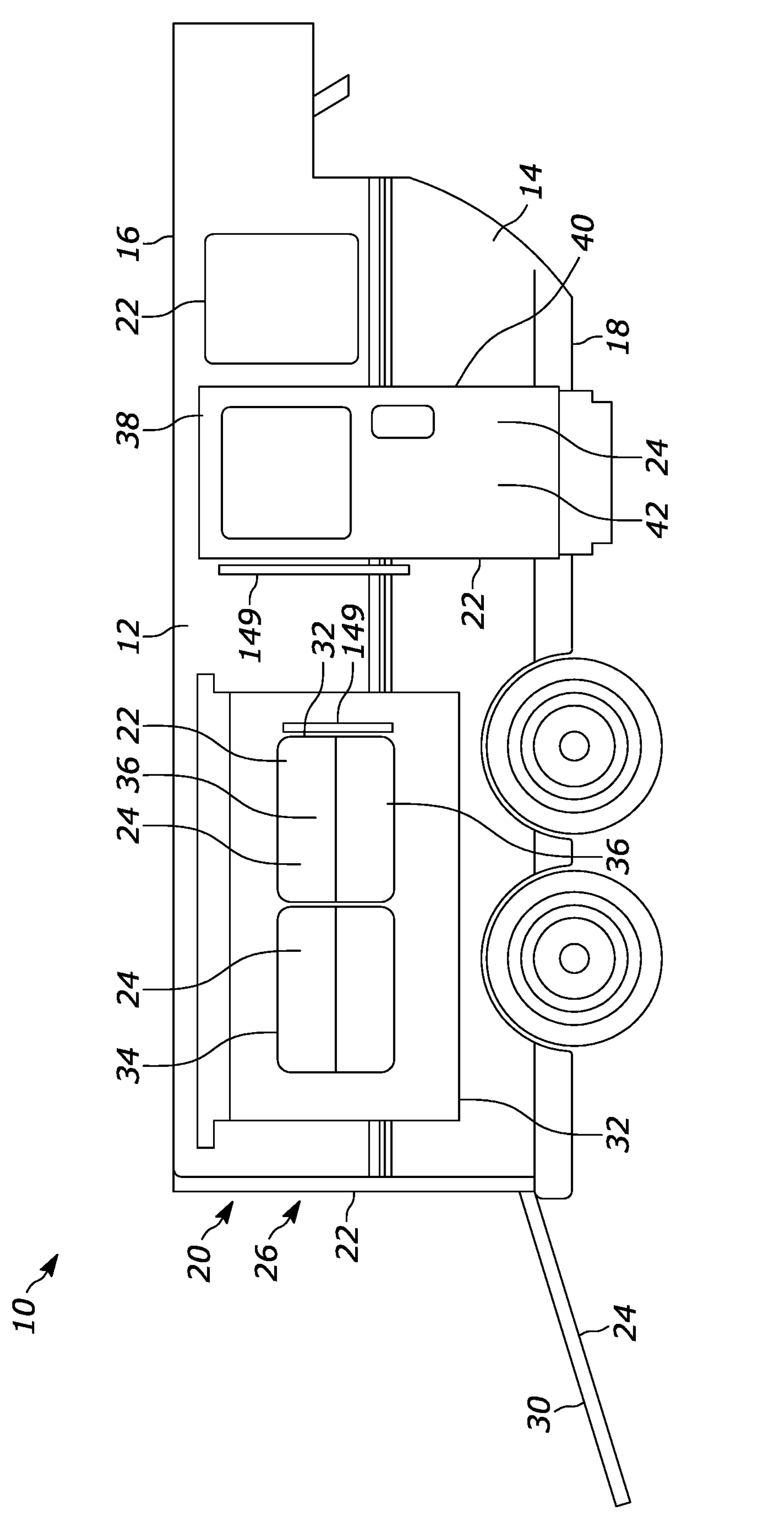
FIG. 1 is a diagrammatic side view of an example recreational vehicle.
Figure 2:
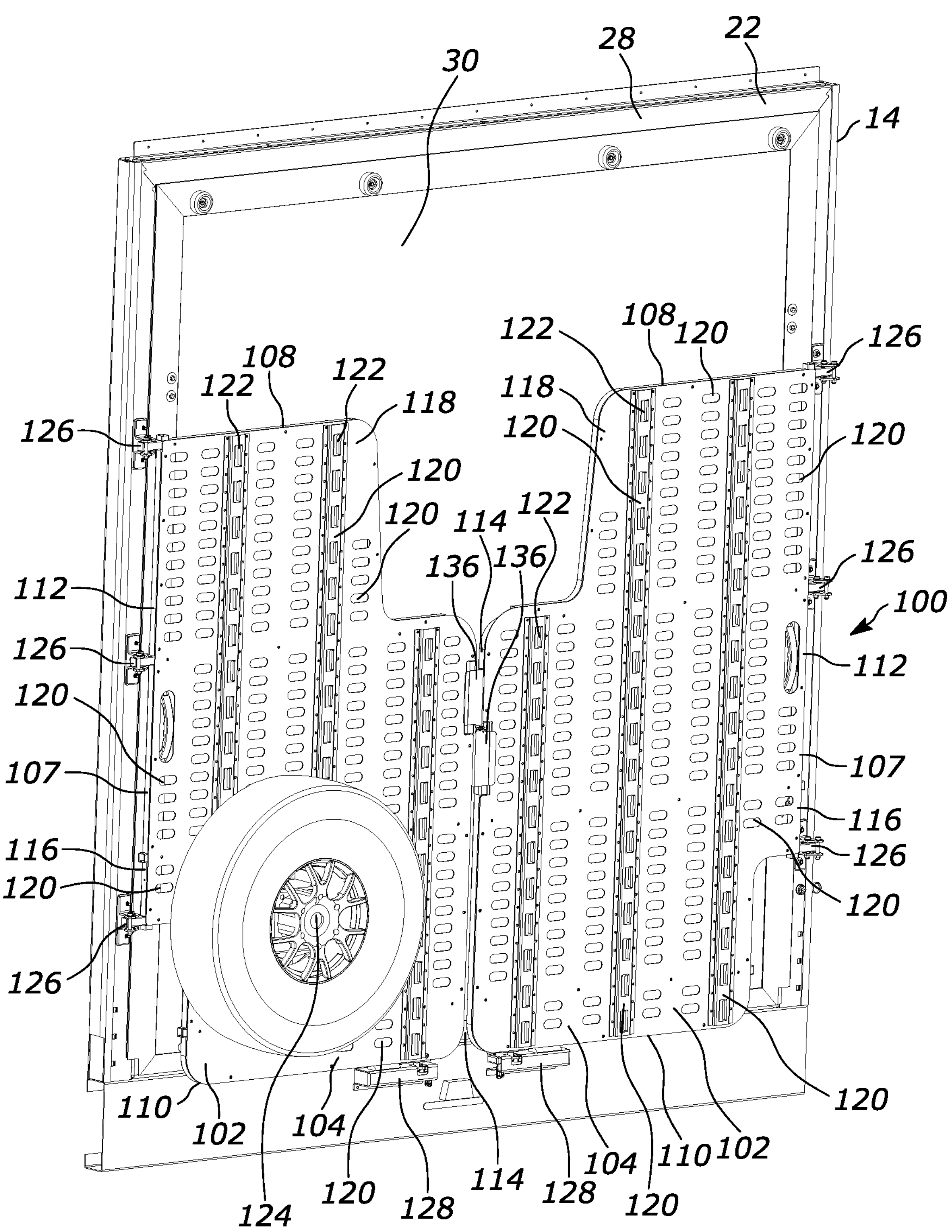
FIG. 2 is a sectional perspective view of example external storage for a recreational vehicle showing storage racks in a storage position.

"Recreational vehicles" or "RVs" as described herein are intended to include toy haulers, travel trailers, fifth wheels, goosenecks, motor homes, campers, and so forth. The RV can be a towable trailer or a motorized unit. An example RV 10 is shown in FIG. 1 that has a body formed by a plurality of upright walls 14, a top wall 16, and a bottom wall 18 defining an interior 20. The RV 10 can include one or more openings 22 that extend through the upright walls 14 and have associated access covers 24 configured to be selectively moved to at least partially expose the openings 22.

In one example, the opening 22 can be a rear opening 26 defined by a ramp door frame 28. In this example, the access cover 24 is a ramp door 30 pivotably mounted to the ramp door frame 28. The ramp door 30 can be pivoted between from a generally vertical, closed position extending within the door frame 28 to a ramp position where the ramp door 30 contacts the ground to enable objects to be easily loaded into and unloaded from the RV 10. The ramp door 30 can also have a suspended position (FIG. 6) over the ground surface where the ramp door 30 is held in a generally horizontal position. This can be achieved by any suitable configuration, such as by jack stands (not shown), cables (not shown), and/or external storage racks as described herein attached to the ramp door frame 28. It will be understood that other suitable methods can be utilized to support the ramp door 30 over the ground surface.

In another example, the opening 22 can be a window opening 32 with a frame 34 extending therearound. The access cover 24 of this example is one or more window panels 36 that can be shifted upwardly or sideways relative to the frame 34 to expose some or all of the window opening 32. In yet another example, the opening 22 can be a door opening 38 (e.g., for personal ingress or baggage storage) with a door frame 40 extending therearound. The access cover 24 of this example is one or more doors 42 pivotable relative to the door frame 40 to expose the door opening 38.

Details of one implementation for external storage 100 for an RV 10 are shown in FIGS. 2-8. The external storage 100 includes a storage rack 102 having front and rear main faces 104, 106, and a perimeter 107 including a top edge 108, a bottom edge 110, a proximal edge 112, and a distal edge 114.

In one configuration, the storage rack 102 includes an outer frame member 116 extending around the perimeter 107 thereof and a plate 118 spanning across the storage rack 102 having edges coupled to the frame member 116. With this configuration, the frame member 116 imparts rigidity and strength to the storage rack 102. If desired, the storage rack 102 can also include any number of horizontal, vertical, and/or angled cross-braces for additional structural reinforcement.

As shown, the storage rack 102 defines a plurality of openings 120 extending therethrough to allow objects to be secured to the storage rack 102. For example, the openings 120 can extend through one or both of the front and rear main faces 104, 106 of the storage rack 102. Alternatively, or in addition thereto, one or more of the openings 120 can be defined by a member or track 122 coupled to the plate 118, such that the openings 120 defined in the track 122 are spaced forwardly or rearwardly from the plate 118. The openings 120 can be disposed in an array across the storage rack 102 (e.g., horizontally, vertically, and/or angularly aligned). The openings 120 can have any desired form or combination of forms, such as e-track openings, a molle grid, and so forth, which allow various connectors (e.g., hooks, e-track connectors, locks, straps, etc.) to couple to the openings 120. It will be understood that the openings 120 can include a variety of different distribution configurations, such as in side-by-side relation, alternating patterns, random, etc.

In the illustrated form, the front and rear main faces 104, 106 are generally planar, giving the storage rack 102 a flat profile that can extend along and generally parallel with an upright wall 14 of the RV 10 when the storage rack 102 is in a storage position. It will be understood that the slightly protruding tracks 122, or other similar structures, are encompassed in a generally planar configuration.

In some implementations, the storage rack 102 can also include connections and/or connectors that protrude away from the front faces 104. For example, the storage rack 102 can have a spare tire mount 124, bicycle racks, or similar structures coupled thereto.

The storage rack 102 can advantageously be pivotable with respect to the RV 10.

Pursuant to this, the external storage 100 includes a plurality of hinges 126, such as two, three as shown, four, or more, coupled to the proximal edge 112 of the storage rack 102 and to the RV 10. The storage rack 102 can be pivoted away from the RV 10, allowing a user to access both the front and rear main faces 104, 106 thereof.

In some implementations, the storage rack 102 can be mounted to the RV 10 adjacent to one of the RV openings 22. Pursuant to this, the plurality of hinges 126 can be coupled to the RV 10 adjacent to the RV opening 22, such as a frame 28, 34, 40 defining the RV opening 22. The storage rack 102 can then be pivoted away from the RV opening 22, allowing a user to manipulate the access cover 24 to selectively expose the opening 22. For example, the storage rack 102 can be pivoted away to provide access to the ramp door 30, the window panels 36, or the doors 42.

In one example, the storage rack 102 is mounted to the RV 10 to pivot relative to the opening 22 about a vertical axis, e.g., to the left or right side of the opening 22. In other examples, the storage rack 102 is mounted to the RV 10 to pivot relative to the opening 22 about a horizontal axis. With this configuration, the storage rack 102 can be mounted above the opening 22 and pivotable upwardly to provide access to the opening 22 or can be mounted below the opening 22 and pivotable downwardly to provide access to the opening 22.

To secure the storage rack 102 to the RV 10 in a storage position extending along the upright wall 14, the external storage 100 includes a storage catch 128 having a first member 130 coupled to the storage rack 102 and a second member 132 configured to be coupled to the upright wall 14 of the RV 10. The first and second members 130, 132 of the storage catch 128 are configured to releasably engage one another so that the storage rack 102 can be selectively pivoted away from the RV opening 22. The first member 130 can be disposed at any suitable location on the storage rack 102 to engage the second member 132. For example, the first member 130 can extend outwardly or inwardly from the perimeter 107, or inwardly from the front main face 104.

Figure 3:
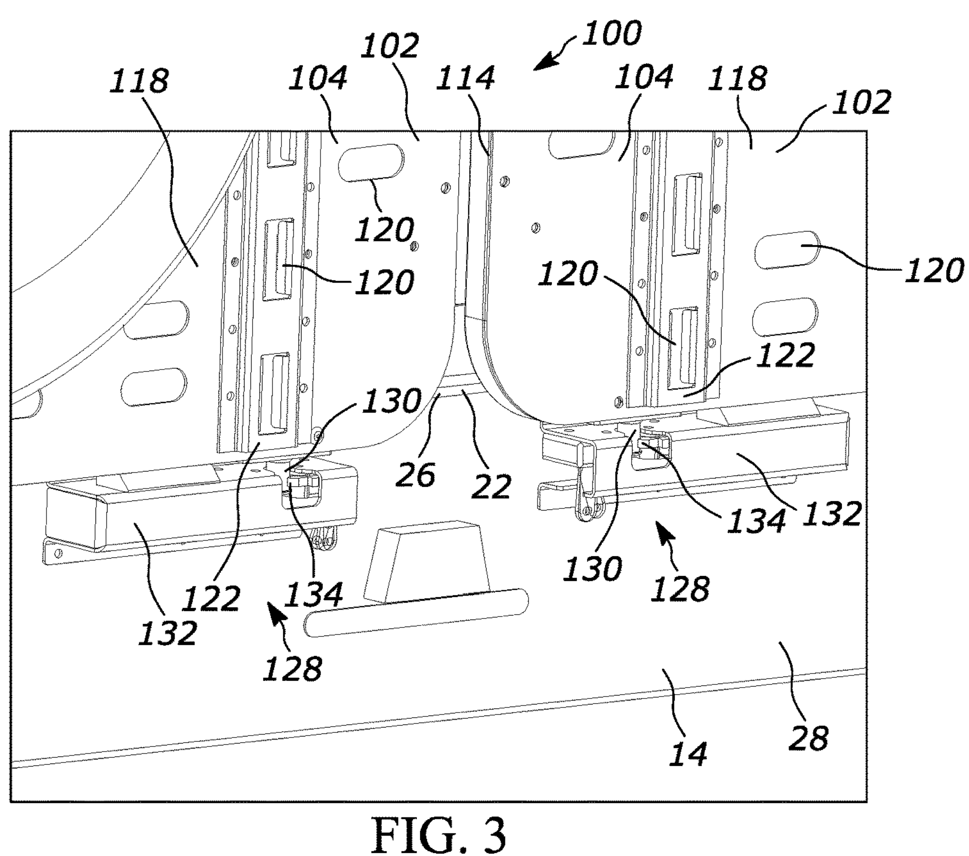
FIG. 3 is a sectional perspective view of a storage catch for the external storage of FIG. 2.

In the illustrated form as shown in FIG. 3, the first member 130 of the storage catch 128 is a pin extending outwardly from the perimeter 107 of the storage rack 102 and the second member 132 of the storage catch 128 is a latch configured to releasably receive the pin therein. The latch 132 can include opposing movable catch members 134 that are configured to deflect when the pin 130 is inserted therebetween and return to catch the pin 130 within the latch 132 when fully inserted therein. If desired, the latch 132 can be lockable to prevent the pin 130 from being released until the latch 132 is unlocked. Other suitable configurations can alternatively be utilized.

While one storage rack 102 may be suitable for many RV openings 22, the external storage 100 can include first and second storage racks 102*a*, 102*b*, with the first and second storage racks 102*a*, 102*b* disposed on opposite sides of the opening 22. The first and second storage racks 102*a*, 102*b* can be configured as described above and, as shown in FIG. 2, can have mirrored structures. The storage racks 102*a*, 102*b* can be sized so that the distal edges 114 thereof extend along one another in the storage position (e.g., each extend halfway across the RV opening 22). Although the storage racks 102*a*, 102*b* are shown pivotable about vertical axes on opposite sides of the RV opening 22, the storage racks 102*a*, 102*b* could alternatively be disposed along a top and bottom of the RV opening 22 and pivotable about horizontal axes.

Figure 4:
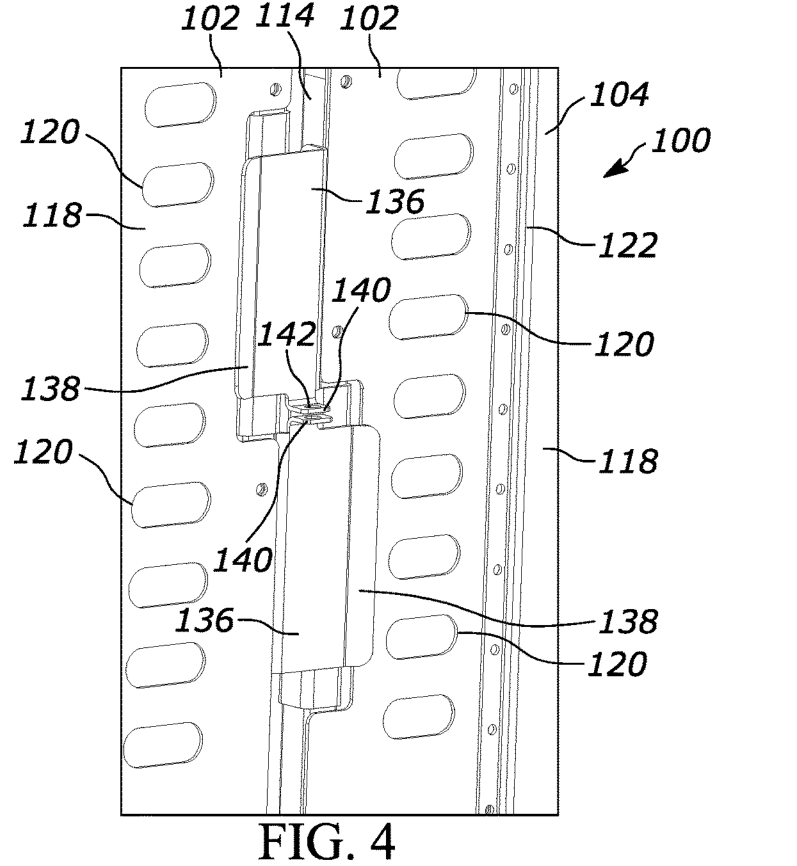
FIG. 4 is a sectional perspective view of handles and lock brackets for the external storage of FIG. 2.

As shown in FIG. 4, the storage racks 102*a*, 102*b* can include structure that overlaps or aligns when the storage racks 102*a*, 102*b* are in the storage position. For example, each of the storage racks 102*a*, 102*b* can include a handle 136 that extends outwardly from the distal edge 114 thereof. The handles 136 are vertically offset with respect to one another, such that the handles 136 have a stacked relation with the storage racks 102*a*, 102*b* in the storage position. With this configuration, the handle 136 of the first storage rack 102*a* extends along the second storage rack 102*b* and the handle 136 of the second storage rack 102*b* extends along the first storage rack 102*a*. If desired, distal ends 138 of the handles 136 can be tapered outwardly to provide a graspable portion for a user when pulling the storage racks 102*a*, 102*b* away from the storage position.

In another example, the first and second storage racks 102*a*, 102*b* can each include a lock bracket 140 having an aperture 142 extending therethrough for reception of a lock member or pin. As shown in FIG. 4, the lock brackets 140 of the first and second storage racks 102*a*, 102*b* are disposed one over one another with the apertures 142 thereof aligned. In one implementation, the lock brackets 140 extend from the handles 136 of the first and second storage racks 102*a*, 102*b*.

If desired, the external storage 100 can also be configured to retain the storage rack 102*a*, 102*b* in an extended position. Pursuant to this, the external storage 100 include an extension catch 144 having a first member 146 coupled to the storage rack 102*a*, 102*b* and a second member 148 coupled to the access cover 24 of the RV 10 or a separate bracket 149 (FIG. 1) coupled to the RV 10 adjacent to the RV opening 22, where the first and second members 146, 148 of the extension catch 144 are configured to releasably engage one another to retain the storage rack 102*a*, 102*b* in an extended position extending outwardly from the upright wall 14. The separate bracket 140 can be pivotable with respect to the upright wall 14, such that the bracket 140 can be stored along the wall 14 when not in use and pivoted outwardly when desired.

In one implementation, the first and second members 146, 148 of the extension catch 144 include magnetic elements 150, 152 (e.g., magnets or a magnet and metal plate) configured to releasably engage one another with the storage rack 102*a*, 102*b* in the extended position. In the illustrated form, the first member 146 includes an arm 154 coupled to the storage rack 102*a*, 102*b* having one of the magnetic elements 150 disposed on a distal end thereof and the arm 154 is configured to align the magnetic element 150 thereon with the magnetic element 152 on the access cover 24 or bracket 149. To store the first member 146, the arm 154 can be pivotably mounted to the storage rack 102*a*, 102*b*, such as to the frame member 116 thereof, so that the arm 154 can be pivoted to extend along the rear face 106 of the plate 118. With this configuration, after the storage rack 102*a*, 102*b* is pivoted to the extended position, the arm 154 is pivoted so that the magnetic element 150 faces the access cover 24 and engages the second magnetic element 150 coupled thereto.

In another implementation, the first and second members 146, 148 of the extension catch 144 can be brackets (not shown) having one or more apertures extending therethrough, where the brackets are configured to extend along one another with the storage rack 102*a*, 102*b* in the extended position to align the one or more apertures thereof, similarly to the handle brackets 140 described above. With this configuration, the extension catch 144 can further include a lock member, or pin configured to be inserted through the aligned openings of the first and second members 146, 148.

Figure 5:
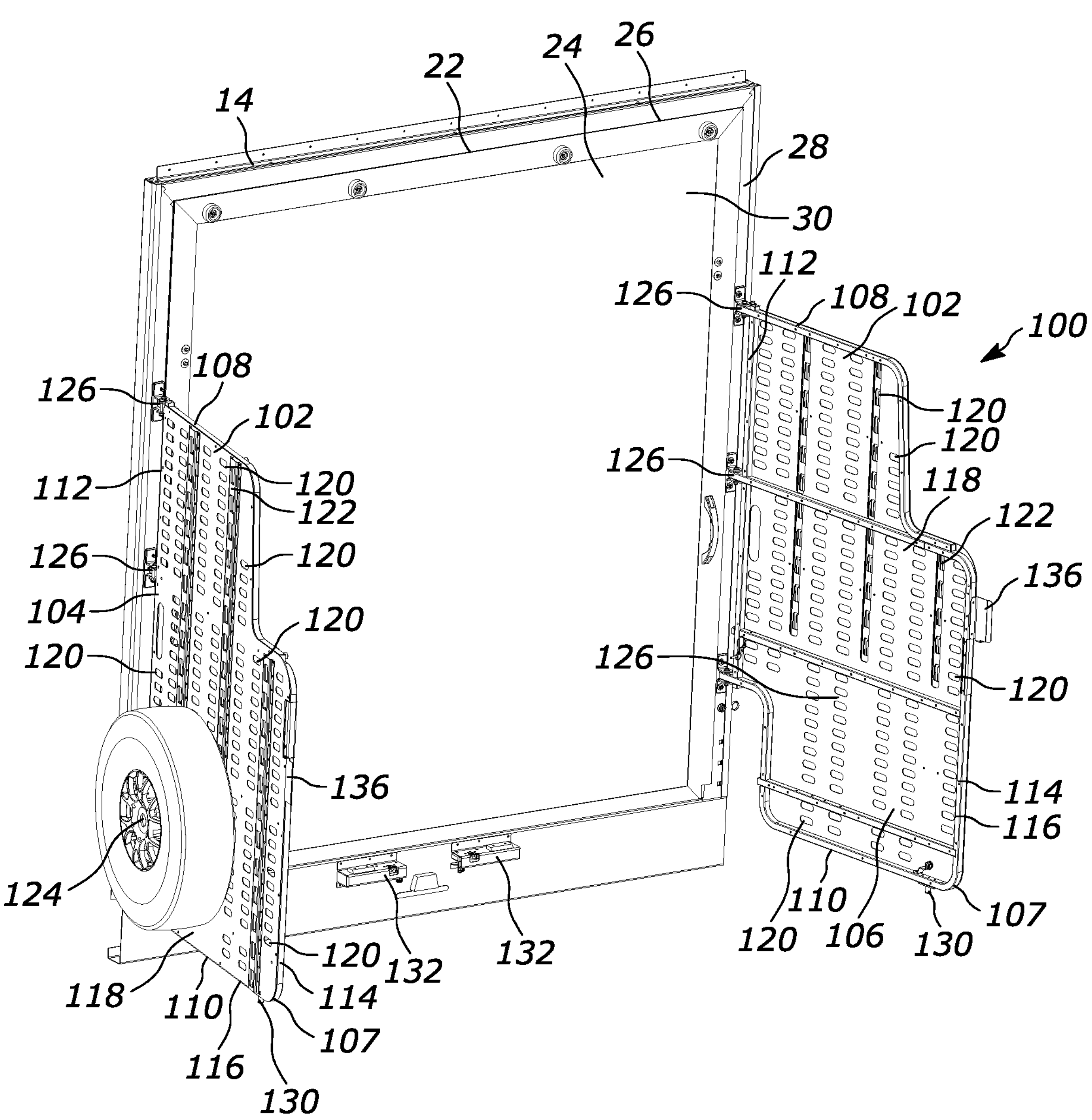
FIG. 5 is a sectional perspective view of the external storage of FIG. 2 showing the storage racks in a pivoted position.
Figure 6:
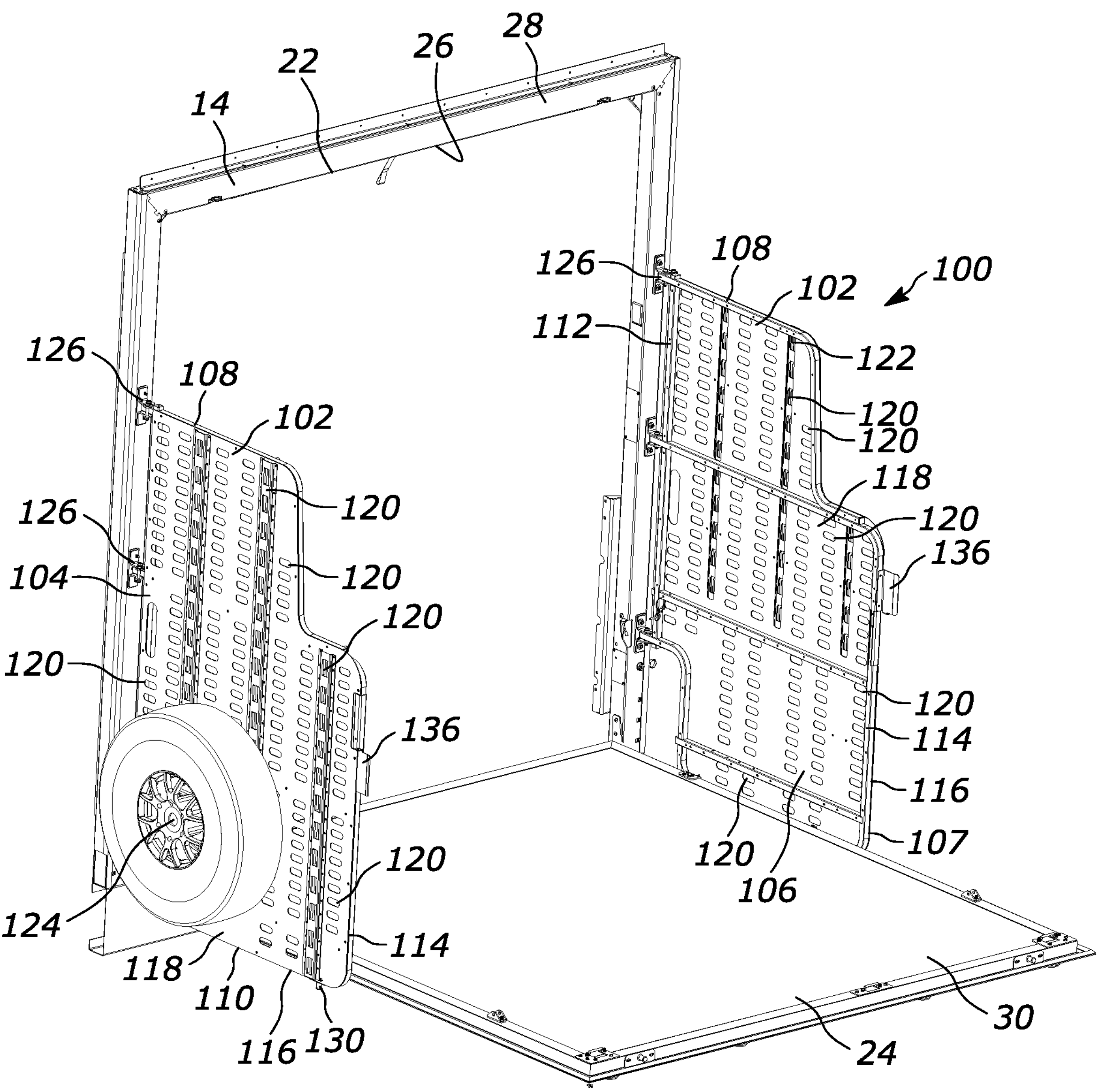
FIG. 6 is a sectional perspective view of the external storage of FIG. 2 showing the storage racks in an extended position coupled to a ramp door of the recreational vehicle.
Figure 7:
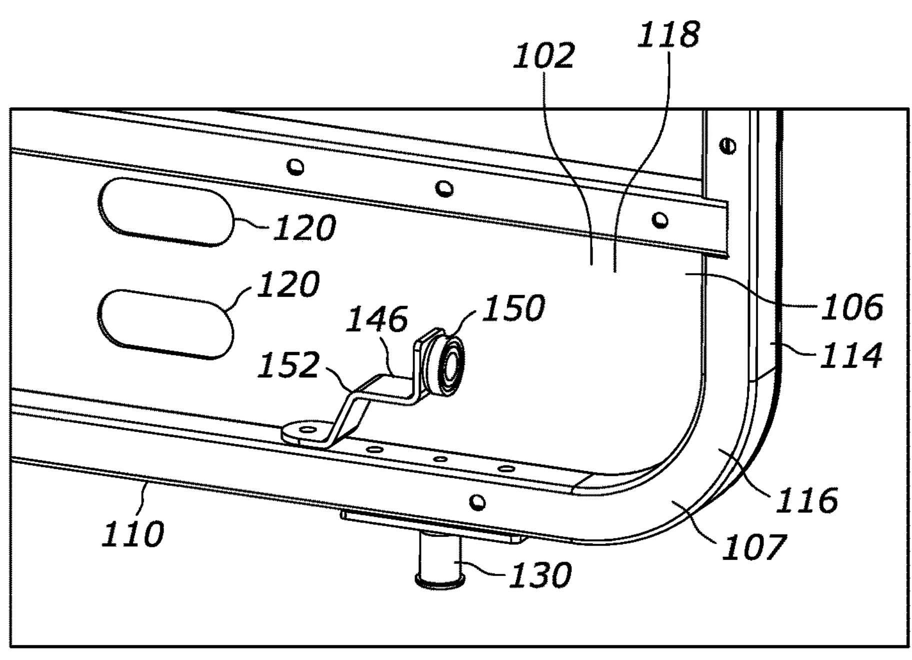
FIG. 7 is a sectional perspective view of an example storage rack of the external storage of FIG. 2 showing first members of storage and extension catches.
Figure 8:
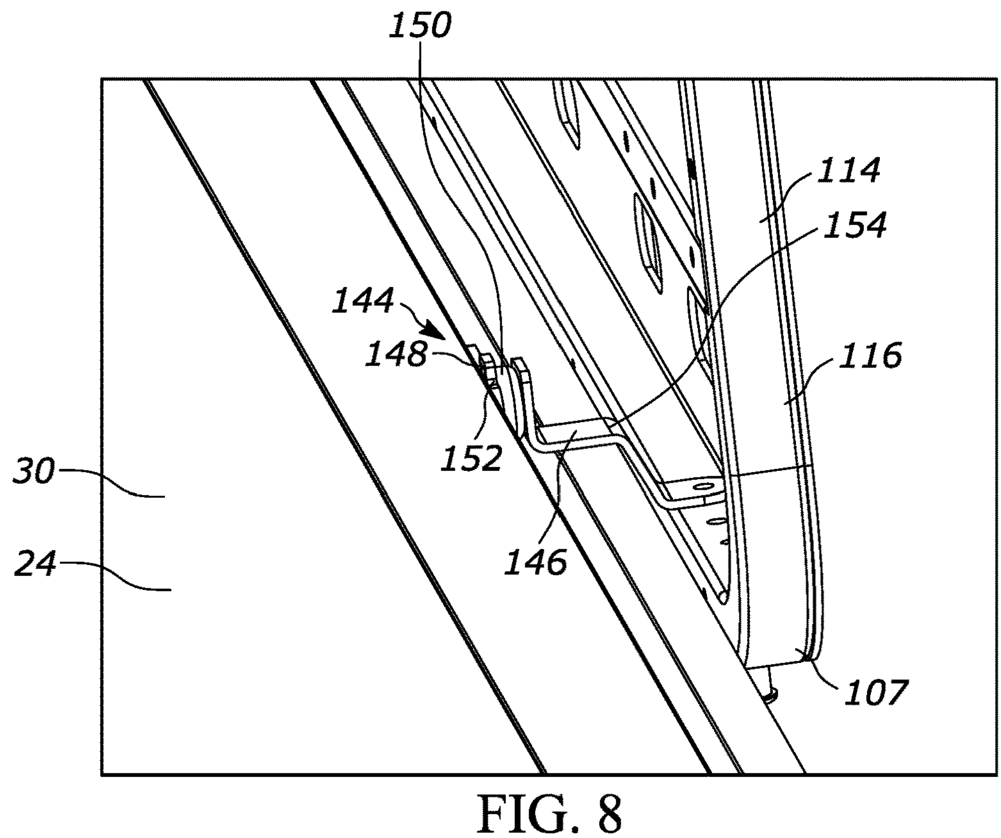
FIG. 8 is a sectional perspective view of the storage rack of FIG. 7 showing the first member of the extension catch coupled to a second member of the extension catch coupled to a ramp door of the recreational vehicle.

In the illustrated form, the storage racks 102*a*, 102*b* are coupled to the RV 10 adjacent to the ramp door 30 thereof. As discussed above, the ramp door 30 is configured to be pivoted so that the distal end thereof contacts a ground surface to thereby unload items from the RV interior 20. The ramp door 30 can also be held in a use position extending generally horizontally away from the RV 10 by any suitable mechanism, such as hydraulics, cables, etc. So configured, the storage racks 102*a*, 102*b* can be pivoted past the extended position, as shown in FIG. 5, to allow the ramp door 30 to be freely pivoted to the unloading position and then pivoted back to the extended position, as shown in FIG. 6, to releasably couple to sides of the ramp door 30.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology. As utilized herein, "coupled" is intended to be connected or attached to by any suitable method, including, for example, using fasteners, welding, linkages, being integral with, and so forth.

The terms "generally", "substantially," "approximately," and "about" used throughout this specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An external storage for a recreational vehicle having an upright wall, the external storage comprising:

a storage rack having front and rear main faces and a perimeter including top, bottom, proximal, and distal edges, the storage rack defining a plurality of openings extending through the front and rear main faces to allow objects to be secured to the storage rack;

a plurality of hinges coupled to the proximal edge of the storage rack allowing the storage rack to be pivoted relative to the recreational vehicle;

a storage catch having a first member coupled to the storage rack and a second member configured to be coupled to the recreational vehicle, the first and second members of the storage catch being configured to releasably engage one another to retain the storage rack in a storage position extending along the upright wall; and an extension catch having a first member coupled to the storage rack and a second member configured to be coupled to the recreational vehicle, the first and second members of the extension catch being configured to releasably engage one another to retain the storage rack in an extended position extending outwardly from the upright wall.

2. The external storage of claim 1, wherein the front and rear main faces of the storage rack are generally planar giving the storage rack a flat profile.

3. The external storage of claim 1, wherein the first member of the storage catch is coupled to the perimeter of the storage rack.

4. The external storage of claim 3, wherein the first member of the storage catch comprises a pin extending outwardly from the perimeter of the storage rack and the second member of the storage catch comprises a latch configured to releasably receive the pin therein.

5. The external storage of claim 1, wherein the first and second members of the extension catch comprise brackets having one or more apertures extending therethrough, the brackets configured to extend along one another with the storage rack in the extended position to align the one or more openings thereof.

6. The external storage of claim 1, wherein one of the first and second members of the extension catch comprises magnetic elements configured to releasably one another with the storage rack in the extended position.

7. The external storage of claim 1, wherein the second member of the extension catch is configured to be coupled to an access cover of the recreational vehicle.

8. The external storage of claim 1, wherein the plurality of openings of the storage rack comprise an e-track array.

9. The external storage of claim 1, wherein the plurality of openings of the storage rack comprise a molle grid array.

10. The external storage of claim 1, further comprising a spare tire mount coupled to the storage rack.

11. The external storage of claim 1, wherein the storage rack comprises a first storage rack, the plurality of hinges comprise a first plurality of hinges, and the storage catch comprises a first storage catch; and further comprising:

a second storage rack having front and rear main faces and a perimeter including top, bottom, proximal, and distal edges, the second storage rack defining a plurality of openings extending through the front and rear main faces to allow objects to be secured to the second storage rack;

a second plurality of hinges coupled to the proximal edge of the second storage rack allowing the body to be pivoted relative to the recreational vehicle; and a second storage catch having a first member coupled to the second storage rack and a second member configured to be coupled to the recreational vehicle, the first and second members of the second storage catch being configured to releasably engage one another to retain the second storage rack in a storage position extending along the upright wall.

12. The external storage of claim 11, wherein the first and second storage racks are configured to be pivotably coupled to the recreational vehicle via the first and second plurality of hinges on opposite sides of an opening in the recreational vehicle in a double door configuration.

13. An external storage for a recreational vehicle having an upright wall, the external storage comprising:

a first storage rack having front and rear main faces and a perimeter including top, bottom, proximal, and distal edges, the first storage rack defining a plurality of openings extending through the front and rear main faces to allow objects to be secured to the first storage rack;

a first plurality of hinges coupled to the proximal edge of the first storage rack allowing the first storage rack to be pivoted relative to the recreational vehicle;

a first storage catch having a first member coupled to the first storage rack and a second member configured to be coupled to the recreational vehicle, the first and second members of the first storage catch being configured to releasably engage one another to retain the first storage rack in a storage position extending along the upright wall;

a second storage rack having front and rear main faces and a perimeter including top, bottom, proximal, and distal edges, the second storage rack defining a plurality of openings extending through the front and rear main faces to allow objects to be secured to the second storage rack;

a second plurality of hinges coupled to the proximal edge of the second storage rack allowing the body to be pivoted relative to the recreational vehicle; and a second storage catch having a first member coupled to the second storage rack and a second member configured to be coupled to the recreational vehicle, the first and second members of the second storage catch being configured to releasably engage one another to retain the second storage rack in a storage position extending along the upright wall;

wherein the first and second storage racks are configured to be pivotably coupled to the recreational vehicle via the first and second plurality of hinges on opposite sides of an opening in the recreational vehicle in a double door configuration; and wherein the first and second storage racks each include a handle extending outwardly from the distal edge thereof, the handle of the first storage rack configured to extend along the second storage rack and the handle of the second storage rack configured to extend along the first storage rack with the first and second storage racks in the storage position.

14. The external storage rack of claim 13, wherein distal ends of the handles are tapered outwardly.

15. The external storage of claim 12, further wherein the first and second storage racks each include a lock bracket having an opening extending therethrough, the lock brackets of the first and second storage racks configured to be disposed one over the other with the openings thereof aligned to receive a lock member therethrough with the first and second storage racks in the storage position.

16. The external storage of claim 15, wherein the lock brackets extend from the handles of the first and second storage racks.

17. A recreational vehicle comprising:

a body having a plurality of walls including an upright wall, the plurality of walls defining an interior; and the external storage of claim 1 pivotably mounted to the upright wall.

18. The recreational vehicle of claim 17, further comprising:

an opening through the upright wall; and an access cover movable between a closed position covering the opening and an open position at least partially exposing the opening;

wherein the access cover comprises a window, a door, or a ramp door.

19. The recreational vehicle of claim 18, wherein the storage rack is configured to pivot relative to the opening about a vertical axis.

20. The recreational vehicle of claim 18, wherein the storage rack is configured to pivot relative to the opening about a horizontal axis.

21. The recreational vehicle of claim 18, wherein the upright wall comprises a frame extending around the opening, the external storage pivotably mounted to the frame.

* * * * *